Oct. 4, 1949.  G. S. WING  2,483,686
DRILL BUSHING AND BRACKET ASSEMBLY
Filed Sept. 24, 1945
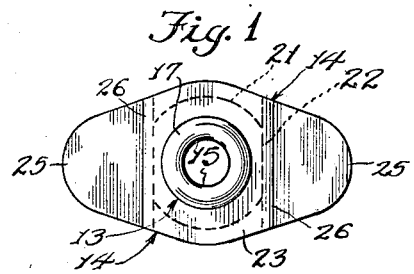
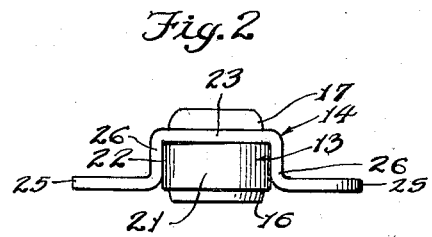
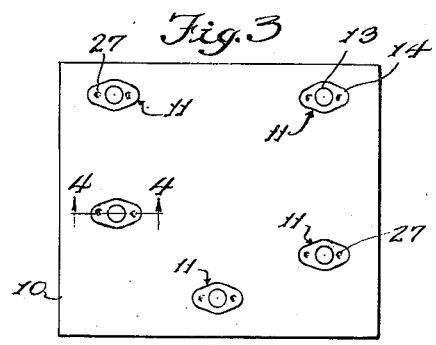
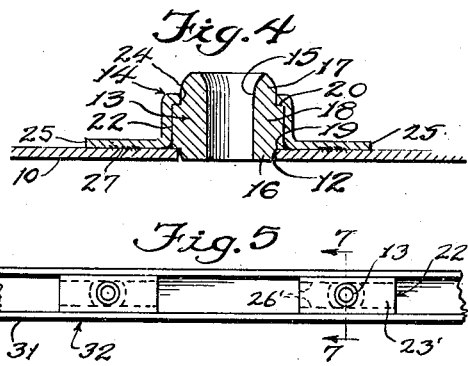
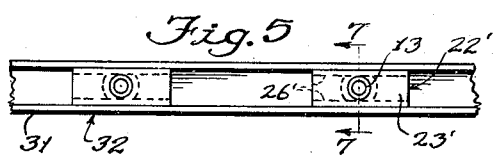
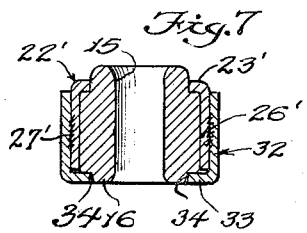
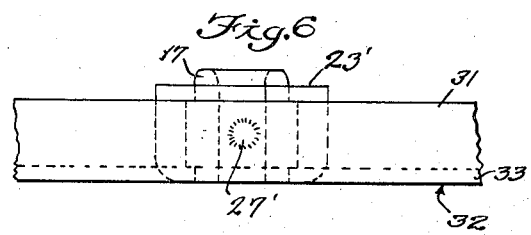
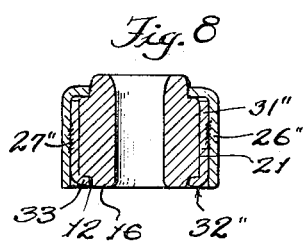
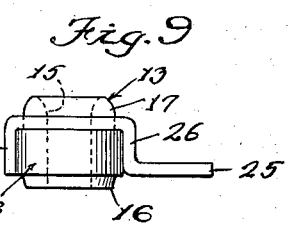
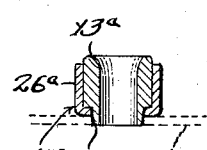
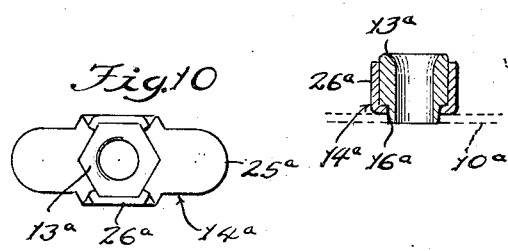
INVENTOR.
George S. Wing
BY Lynn C. Latta
Attorney

Patented Oct. 4, 1949

2,483,686

UNITED STATES PATENT OFFICE 2,483,686

DRILL BUSHING AND BRACKET ASSEMBLY

George S. Wing, Hermosa Beach, Calif.

Application September 24, 1945, Serial No. 618,152

3 Claims. (Cl. 77—62)

This invention relates to drill jigs and has as its primary object to provide a drill bushing and bracket assembly from which accurate and durable drill jigs can be constructed at considerably less expense than has been hitherto involved in this general class of work.

In the past it has been customary to construct drill jigs from heavy plate steel which is usually from 3/8" to 1/2" thick. In some cases drill jigs are assembled from strips of equivalent thickness. The base is then jig bored after drill points have been laid out thereon by hand by the use of properly located prick punch marks. The holes that are bored in the base are of the proper diameter to snugly receive hardened steel bushings which are fitted into the holes and secured either by a press fit or by screws extended through notches in head flanges on the bushings, and threaded into the base. This requires the drilling and tapping of an additional hole for each drill bushing. These holes must all be accurately located with reference to the main bushing hole, and this entails a great amount of extremely exacting work.

One of the difficulties in drilling the bushing holes in a thick jig base is the tendency of the drill to drift away from the centers that have been laid out for the bushing holes. It is also possible to have the axis of the bushing holes deviate from a true perpendicular to the plane of the jig. Since the drill bushings are located and positioned by their snug fit in the drill holes, they will assume whatever inaccuracies that have occurred in the drilling of the holes.

The use of the drill jig provides for the most rapid and accurate drilling of rivet and bolt holes in matching parts such as, for example, the frame and skin of an airplane. However, because of the high cost of drill jigs, it is customary to use other methods. For example, in some cases the skin is fitted to the frame, rivet holes are laid out by hand with measuring instruments, dividers, etc., the centers are prick punched and the skin and frame are subsequently drilled at the punch marks. Such drilling usually requires first making a locating drill hole with a smaller drill and subsequently reaming the hole with a larger drill in order to avoid the difficulty of drifting of the drill.

Another method that is often employed is to utilize a locating template having holes for piloting a prick punch that is used to locate drill centers on the work. The locating template usually consists of a sheet metal replica of the work, having properly located holes therein.

Another method that is sometimes used is to construct a multiple punch to punch properly located holes in the work, and to use the work (for example, the skin of an airplane) as a template for drilling into the frame after the skin has been assembled thereon.

All of these methods of course are slow with the exception of that last named, which, however involves considerable expense in the making of a punching die.

The drill jig is of course the most satisfactory apparatus for locating and drilling holes in a large number of parts, and the present invention aims to provide a drill jig having even greater accuracy than presently available jigs and yet much less expensive in construction and more adaptable and easy to handle. It eliminates the necessity for employing the thick jig base and greatly speeds up the assembly of the drill bushings in the base.

A specific object of the invention is to provide a novel drill bushing having means for attaching the same to a jig base rapidly and accurately.

Another object of the invention is to provide a means whereby the construction of a drill jig may be carried out with greater accuracy than is possible with present methods.

A further object is to provide a drill jig of lighter weight than previous drill jigs of equivalent efficiency.

Other objects of the invention will appear from a perusal of the ensuing specifications, when read in connection with the appended drawings in which:

Fig. 1 is a plan view of a drill bushing and bracket assembly embodying my invention;

Fig. 2 is a side view of the same;

Fig. 3 is a plan view of a drill jig embodying the drill bushing of Fig. 1;

Fig. 4 is a sectional view taken on the line 4—4 of Fig. 3;

Fig. 5 is a plan view of a drill jig embodying a modified form of the invention;

Fig. 6 is a side elevation of the drill jig shown in Fig. 5;

Fig. 7 is a transverse sectional view taken on the line 7—7 of Fig. 5;

Fig. 8 is a transverse sectional view of a drill jib embodying a modification of the drill jig shown in Fig. 5;

Fig. 9 is a side elevation of another modification embodying the invention;

Fig. 10 is a plan view of a drill bushing unit embodying a further modification of the invention;

Fig. 11 is a transverse sectional view through the drill bushing unit of Fig. 10.

As an example of one form of drill jig embodying the invention, I have shown in Figs. 1 to 4 inclusive a drill jig embodying a template 10 and a plurality of drill bushing units 11 secured thereto. The template 10 is of sheet metal as indicated in Fig. 4. The use of sheet metal for the base has a number of advantages. It makes the jigs much lighter than jigs in common use. It makes it possible to conform the jig to a curved or irregular contour by simply bending or forming the base. It is much easier to punch accurately centered holes in a thin sheet of metal than in a thick plate of metal. There is less likelihood of the drill drifting to any appreciable extent, and in the present invention, it makes no difference whether the cylindrical side wall of the hole is exactly perpendicular to the face of the template or not.

In constructing the jig, the template 10 is first punched to provide therein a plurality of openings 12 (see Fig. 4) from previously located center marks. The openings 12 then become a means for locating the drill bushings 13 which are provided with necked-down annular end portions constituting pilots adapted to be snugly fitted in the openings 12.

Each drill bushing unit 11 comprises a hardened steel bushing 13 and a bracket 14 by means of which it is secured to the base 10. The bushing 13 has a drill guide bore 15 of conventional shape and finish, and is formed with the necked-down annular end portions pilots 16 and 17 and a thicker intermediate body portion 18. Defined between the end portions 16 and 17 and the intermediate body portion 18 are shoulders 19 and 20. The body portion 18 has an exterior surface that is partially cylindrical, as indicated at 21 in Fig. 1, and has opposed parallel side flats 22.

The bushing bracket 14 is of stamped sheet metal, and has a central web portion 23 which is provided with an opening 24 to receive the pilot 17 of the bushing. A pair of ears 25 are connected in offset relation to the web portion 23 by parallel legs 26. The legs 26 being disposed at right angles to the web portion 24, these members impart to the bracket an inverted U-shaped. The flats 21 of the bushing are snugly embraced between the legs 26 to prevent the bushing from turning when a drill is operating therein. This is important in preventing the bushing from becoming loose in the openings in which it is piloted.

The engagement of the pilot of the bushing 13 in the opening 24 of the web 23, together with the fit of the flats 21 between the legs 26 of the brackets, secures the bushing in place in the bracket so that the bushing unit may be transported and handled without coming apart.

In the construction of the jig, the unit is applied to the base 10 by simply slipping the pilot 16 of a bushing into the opening 12 in the base, holding the bushing against the base in a position thus located, and welding the ears 25 to the base as indicated at 27. The construction of a drill jib therefore involves merely the punching of the locating holes in the sheet metal base 10, the subsequent application of a number of the drill bushing units to these holes, and the spot welding of the ears of the brackets to the base. The drill bushing units will be of standardized construction, although the sizes of the units will of course vary in accordance with the diameter of the drill guide bore 15 of the bushing.

In the completed jib the bushings 13 are anchored with the axes of their drill guide bores 15 at right angles to the plane of the template 10. This is accomplished by driving each drill bushing into a respective opening 12 until the shoulder 19 flatly contacts the upper surface of the base 10. The pilot 16 of the bushing is slightly tapered on its outer surface so that it must be driven tightly home in order to bring the shoulder 19 tightly into contact with the base 10, and once driven into the opening 12 in this manner, the bushing will be securely held in the opening until the ears 25 are welded to the base 10.

In the older types of drill jigs, bushings were positioned in accordance with the axes of the openings drilled in the heavy jig base. If these openings were not exactly at right angles to the surface of the jig base, the bushings would be correspondingly tilted.

Having located the bushing squarely at right angles to the surface of the template 10 by driving it home as above described, it is permanently secured in the correct position at right angles to the template 10 by the welds 27. Thus the invention provides for holding the bushing firmly at both ends so as to prevent it from yielding laterally under the pressure of the drill.

It is to be noted that the ears 25 are properly positioned for welding when the bushing has been driven home into the hole 12, and that there is no necessity for otherwise locating the ears 24.

The shoulders and pilots of the bushings are lathe turned, and the two flats 21 on the sides of the bushings are milled as by stringing a number of bushings on a mandrel and passing them collectively between a pair of spaced milling cutters in order to achieve extreme accuracy.

In the form of the invention shown in Figs. 5, 6 and 7, bushings 13 are secured in the web portion 23' of a bracket 22' which is in the form of a channel having a pair of side flanges 26' snugly engaging the flats 21 of the bushings. The side flanges 26' are adapted to fit between the side flanges 31 of a channel bar 32, and the reduced end portions 16 of the bushings 13 are driven snugly into openings 34 in the web 33 of the channel 32. When the bushings have thus been driven home, the side flanges 26' are welded to the side flanges 31 as at 27'. This type of jig is used for drilling a number of holes that are in aligned relationship.

In the form of the invention shown in Fig. 8, the construction is the same as that disclosed in Figs. 5, 6 and 7 with the exception that the side flanges 26'' of the channel bracket 22'' are spaced from the flats 21 so that the flanges 31'' of the channel 32'' may be received between the side flanges 26'' and the flats 21. The parts are welded as at 27''.

The form of the invention shown in Fig. 9 is the same as that shown in Figs. 1-4 inclusive except that only one ear 25 is utilized.

In the form of the invention shown in Figs. 10 and 11, the drill bushing 13a is constructed from hexagonal rod stock, and is secured in a bracket 14a that is provided with ears 26a engaging opposite sides of the bushing. The ends of the ears 26a are bent around the corners of the bushing 13a. The pilot 16a is extended through an opening in the web of the bracket 14a and projects therebeyond so that it may be received in an opening in the base 10a.

I claim as my invention:

1. A drill guide bushing and bracket assembly for attachment to a template having a pilot opening therein, for the construction of a drill jig, comprising: a drill guide bushing having necked-down annular end portions constituting pilots one of which, in the completed drill jig, is fitted into said pilot opening to accurately position the bushing on the template; and a bracket including an ear for attachment to said template and a part offset from the plane of said ear and having an opening snugly receiving the other of said pilots, whereby in the completed jig the bushing is securely held between said template and said bracket part with its respective ends secured by the retention of said pilots in said openings.

2. A drill guide bushing and bracket assembly for attachment to a template having a pilot opening therein, for the construction of a drill jig, comprising: a drill guide bushing including a body portion having opposed parallel side flats and including a necked-down annular end portion constituting a pilot to be fitted into said pilot opening to accurately position the bushing on said template; and a bracket for attaching the bushing to the template, said bracket being of inverted U-shape and open sided, and including a pair of spaced parallel legs snugly embracing said body portion in contact with said flats to prevent rotation of the bushing and a web portion joining said legs and snugly engaged against the outer end of said body portion, the inner end of said body portion defining a shoulder at the base of said pilot, said body portion, in the completed jig, being confined between said web, said legs and the template with said shoulder bearing against the template, and means for preventing lateral movement between the outer end of the bushing and the bracket in a direction parallel to said flats.

3. A drill guide bushing and bracket assembly for attachment to a drill jig template having a pilot opening therein, comprising: a drill guide bushing including an intermediate body portion having opposed parallel side flats, and including necked-down annular end portions constituting pilots one of which is fitted into said pilot opening in the process of constructing a drill jig, whereby to accurately position the bushing on said template, the ends of said body portion defining shoulders at the bases of said pilots; and a bracket of inverted U-shape including a central web portion having an opening snugly receiving the other of said pilots, said web portion abutting the shoulder adjacent said other pilot, said bracket further including a pair of ears for attachment to said template and a pair of spaced parallel legs snugly embracing said intermediate body portion, in contact with said flats, and connecting said ears to said web portion in offset relation thereto, with the other shoulder disposed substantially in the plane of the template engaging faces of said ears, whereby said other shoulder will bear against said template in the assembled drill jig.

GEORGE S. WING.

REFERENCES CITED

The following references are of record in the file of this patent:

UNITED STATES PATENTS

| Number | Name | Date |
| --- | --- | --- |
| 1,237,143 | Allen | Aug. 14, 1917 |
| 2,096,623 | Almdale | Oct. 19, 1937 |
| 2,202,405 | Smith | May 28, 1940 |
| 2,249,923 | Whitcombe | July 22, 1941 |
| 2,304,107 | Leisure | Dec. 8, 1942 |
| 2,310,532 | Langmaid | Feb. 9, 1943 |
| 2,355,263 | Bloomfield | Aug. 8, 1944 |
| 2,363,006 | Klaus | Nov. 21, 1944 |
| 2,367,582 | Honyoust | Jan. 16, 1945 |
| 2,389,989 | Luce | Nov. 27, 1945 |
| 2,415,695 | Kann | Feb. 11, 1947 |
| 2,417,539 | Aronson | Mar. 18, 1947 |
| 2,426,653 | Whelan et al. | Sept. 2, 1947 |